(12) United States Patent
Ohsaki et al.

(10) Patent No.: US 6,324,903 B1
(45) Date of Patent: Dec. 4, 2001

(54) APPARATUS AND METHOD FOR DETECTING ATMOSPHERIC PRESSURE IN AN INTERNAL COMBUSTION ENGINE

(75) Inventors: Masanobu Ohsaki; Shinji Kanai, both of Gunma (JP)

(73) Assignee: Unisia Jecs Corporation, Isesaki (JP)

( * ) Notice: Subject to any disclaimer, the term of this patent is extended or adjusted under 35 U.S.C. 154(b) by 0 days.

(21) Appl. No.: 09/286,840

(22) Filed: Apr. 6, 1999

(30) Foreign Application Priority Data

Apr. 30, 1998 (JP) .................................................. 10-120678

(51) Int. Cl.[7] .................................................. G01M 19/00
(52) U.S. Cl. .................................................. 73/118.2
(58) Field of Search .............................. 73/117.2, 117.3, 73/118.1, 118.2, 116; 123/399, 564, 531

(56) References Cited

U.S. PATENT DOCUMENTS

| 4,938,195 | * | 7/1990 | Miyazaki et al. | 123/488 |
| 5,456,231 | * | 10/1995 | Suzuki et al. | 123/399 |
| 5,614,667 | * | 3/1997 | Hosoya | 73/118.2 |

* cited by examiner

Primary Examiner—Benjamin R. Fuller
Assistant Examiner—Maurice Stevens
(74) Attorney, Agent, or Firm—Foley & Lardner

(57) ABSTRACT

An apparatus for detecting atmospheric pressure in an internal combustion engine includes an open angle detecting portion for detecting an open angle of a throttle valve, and an atmospheric pressure detecting portion updates the atmospheric pressure based on an aspiration pressure when the open angle of the throttle valve is above a threshold S/L and is increasing.

19 Claims, 6 Drawing Sheets

APPARATUS AND METHOD FOR DETECTING ATMOSPHERIC PRESSURE IN AN INTERNAL COMBUSTION ENGINE

BACKGROUND OF THE INVENTION

1. Field of the Invention

The present invention relates in general to an apparatus and method for detecting atmospheric pressure in an internal combustion engine, and more particularly to a technique for detecting atmospheric pressure by using an aspiration pressure sensor during operation of the internal combustion engine.

2. Description of the Related Art

In general, the aspiration pressure sensor detects aspiration pressure at the lower reaches of a throttle valve in the internal combustion engine. When an open angle of the throttle valve is at full opening position, the aspiration pressure detected by the aspiration pressure sensor is roughly equal to the atmospheric pressure.

A Japanese Patent Publication No. Heisei 7-35749, published on Apr. 19, 1995, exemplifies a previously proposed apparatus for detecting atmospheric pressure in an internal combustion engine.

In the disclosure of the above-mentioned Japanese Patent Publication, when the open angle of the throttle valve is at a full opening position, atmospheric pressure is detected by the aspiration pressure sensor. If atmospheric pressure is only detected when the open angle of the throttle valve is at the full opening position, it is difficult to have a sufficient opportunity to accurately detect the atmospheric pressure. Therefore, when the open angle of the throttle valve is above a threshold level, the pressure detected by the aspiration pressure sensor is assumed to be the atmospheric pressure.

However, in a case of detecting atmospheric pressure when the open angle of the throttle valve is above the threshold level, the most recent detected value of the aspiration pressure sensor is assumed to be the atmospheric pressure, which value always updates a previously-stored value. As a result, when the open angle of the throttle valve decreases below the threshold level after full opening of the throttle valve, the storage value is updated by a low precision value which is detected by the lower open angle of the throttle valve, and this value replaces the previously-stored value corresponding to a full opening of the throttle valve.

Though the detecting precision can be maintained by selecting the threshold level closer to the full opening of the throttle valve, it is still difficult to have a sufficient opportunity to accurately detect the atmospheric pressure.

SUMMARY OF THE INVENTION

It is, therefore, an object of the present invention to provide an apparatus and method for detecting atmospheric pressure in an internal combustion engine which can detect atmospheric pressure accurately while providing a sufficient opportunity to detect the atmospheric pressure.

To satisfy the foregoing and other objects, an apparatus and corresponding method for detecting atmospheric pressure in an internal combustion engine is provided, comprising: open angle detecting means for detecting an open angle of a throttle valve; and atmospheric pressure detecting means for updating atmospheric pressure based on aspiration pressure when the open angle of the throttle valve is above a threshold value and is increasing. The apparatus further comprises open angle clearing means for closing the open angle of the throttle valve when the present open angle of the throttle valve is under the threshold value or for closing the last updated open angle of the throttle valve after a predetermined time. In a further aspect of the present invention, the apparatus further comprises timer means for determining whether an elapsed-time exceeds the predetermined time or not.

DETAILED DESCRIPTION OF THE PREFERRED EMBODIMENTS

Figure 1:
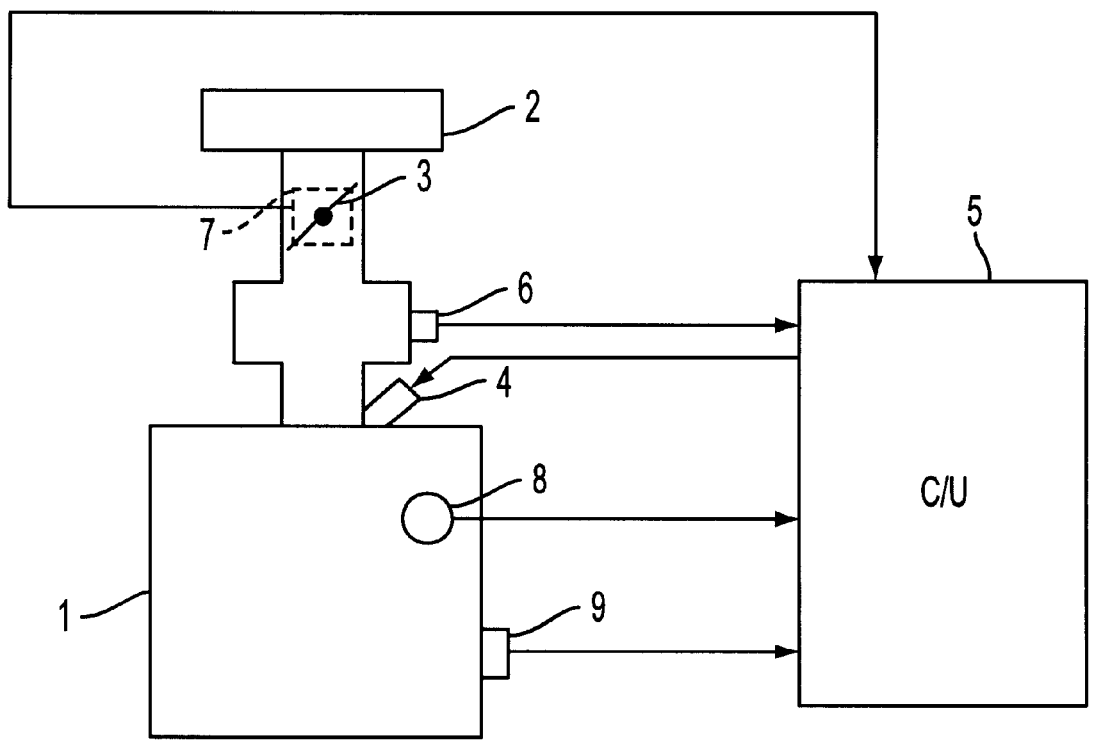
FIG. 1 is a system diagram of an apparatus for detecting atmospheric pressure in an internal combustion engine according to a first embodiment of the present invention.

The first embodiment of the present invention shows an apparatus for detecting atmospheric pressure in an internal combustion engine as shown in FIG. 1. In the internal combustion engine 1, intake air through an air cleaner 2 is adjusted by a throttle valve 3 and is aspirated into a cylinder of the internal combustion engine 1. A combustible mixture comprises the intake air and fuel injected from a fuel injection valve 4. The mixture is ignited by an ignition mechanism (not shown).

An electronic control unit 5 controls the fuel injection valve 4 and receives detecting signals from various sensors. A fuel injection pulse for the fuel injection valve 4 is calculated based on the detected signals, which is output to the fuel injection valve 4. The sensors include an aspiration pressure sensor 6, which detects aspiration pressure (PB) in the lower reaches of the throttle valve 3, a throttle sensor 7 (open angle detecting means) that detects the open angle of the throttle valve 3 (TVO), a temperature sensor 8 which detects the cooling temperature (TW) of the internal combustion engine 1, and a crank angle sensor 9 which detects the crank angle of the internal combustion engine 1.

Since it is possible to calculate the engine rotation speed (Ne) based on the detecting signal of the crank angle sensor 9, the control unit 5 calculates the basic injection pulse based on the aspiration pressure (PB) and the engine rotation speed (Ne), and also calculates the final injection pulse based on the cooling temperature TW which corrects the basic injection pulse.

Figure 2:
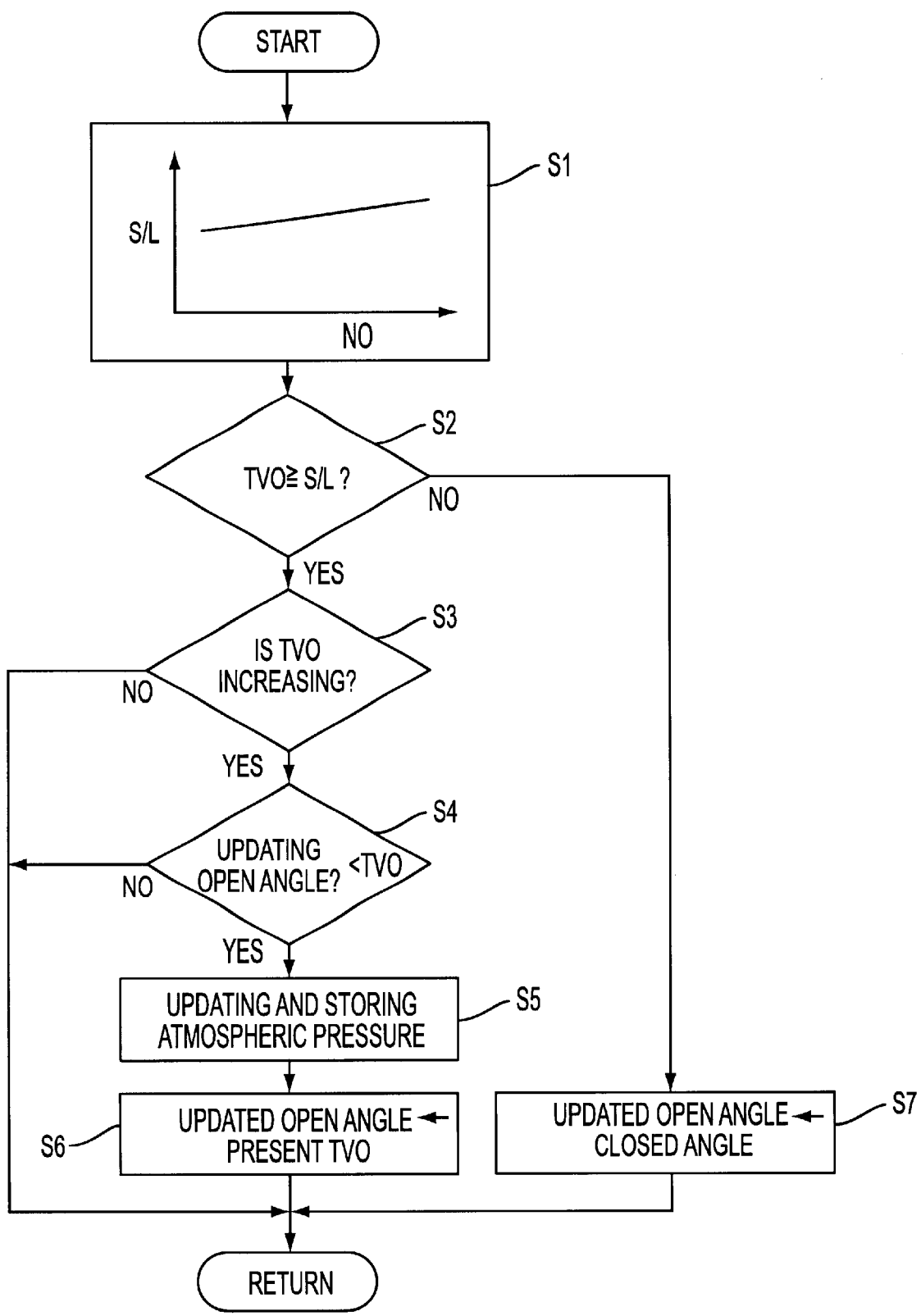
FIG. 2 is a flowchart of the atmospheric pressure detecting control process according to the first embodiment of the present invention.

Also, the control unit 5 detects the atmospheric pressure using the aspiration pressure sensor 6 as shown in the Flowchart of FIG. 2.

In the Flowchart of FIG. 2, step S1 shows a correspondence between a threshold value (S/L) of the open angle of the throttle valve 3 (TVO) versus engine speed (Ne), and which decides an area for detecting atmospheric pressure. Step S2 judges whether or not the present open angle of the throttle valve is above the threshold S/L.

When the open angle of the throttle valve is above the threshold S/L, step S3 decides whether the open angle of the throttle valve is increasing or decreasing according to whether the present open angle of the throttle valve is greater than the last updated open angle of the throttle valve or not. When the open angle of the throttle valve is decreasing or constant in step S3, the routine is ended and the atmospheric pressure is not updated.

On the other hand, when the open angle of the throttle valve is increasing, step S4 decides whether the present open angle of the throttle valve is greater than the last updated open angle of the throttle valve. When the present open angle of the throttle valve is not greater than the last updated open angle of the throttle valve, the routine is ended.

When the present open angle of the throttle valve is greater than the last updated open angle of the throttle valve, the newest detected value of the aspiration pressure sensor is assumed to be the atmospheric pressure, and is used to update a storage value in step S5.

Figure 3:
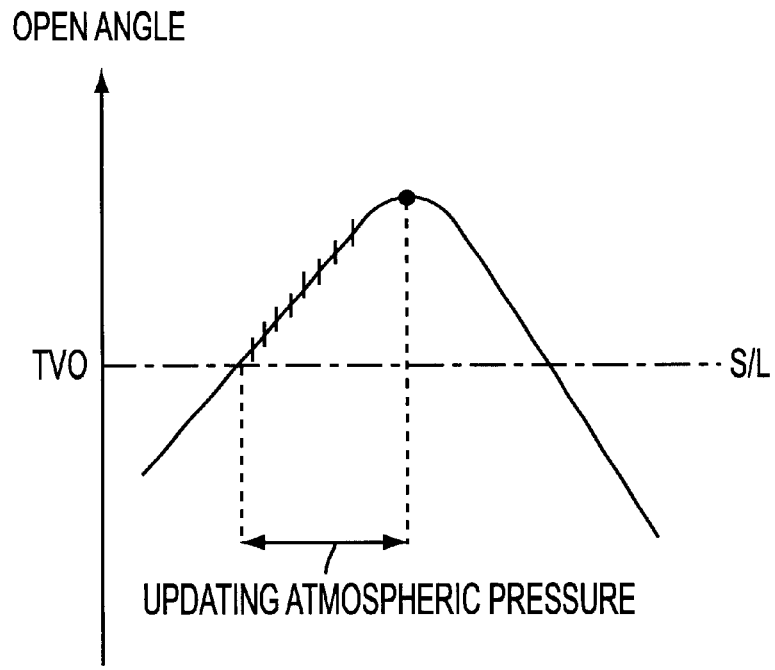
FIG. 3 is a time chart showing detecting characteristics of atmospheric pressure according to the first embodiment of the present invention.

Step S6 replaces the present open angle of the throttle valve with the open angle of the throttle valve when the storage value is updated by the newest detected value of the aspiration pressure sensor. That is, when the open angle of the throttle valve is not only greater than the threshold S/L but is also increasing, atmospheric pressure is permitted to be updated and stored. As a result, stored atmospheric pressure is prohibited from being replaced by atmospheric pressure based on a smaller open angle of the throttle valve. The detected value of atmospheric pressure can be maintained as close as possible to the full open angle of the throttle valve, as shown in FIG. 3.

Figure 4:
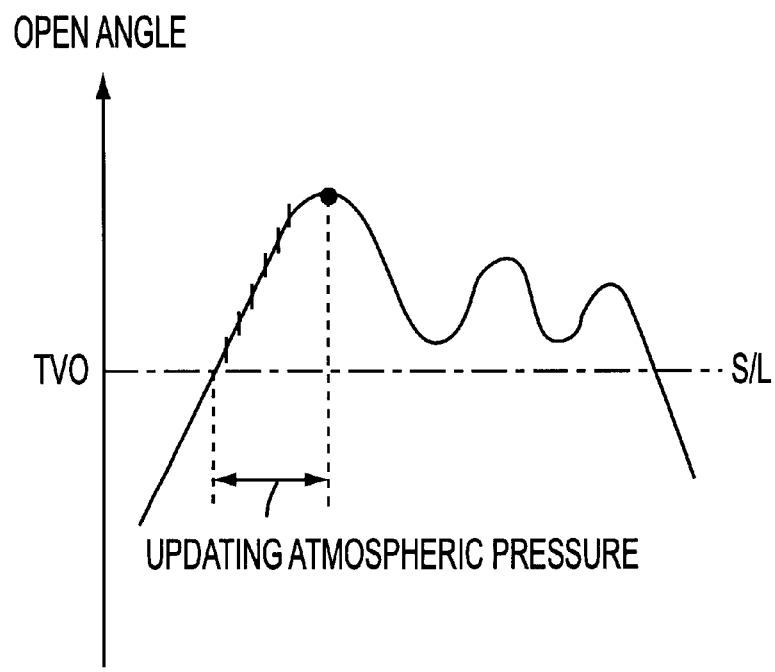
FIG. 4 is another time chart showing detecting characteristics of atmospheric pressure according to the first embodiment of the present invention.

Also, when the present open angle of the throttle valve is greater than the last updated open angle of the throttle valve, atmospheric pressure is permitted to be updated and stored. When the open angle of the throttle valve is increasing or decreasing in the area above the threshold S/L and the open angle of the throttle valve is increasing in the area having a smaller open angle than the maximum open angle of the throttle valve, the stored atmospheric pressure is prohibited from being replaced by the detected value of atmospheric pressure, as shown in FIG. 4.

In the above mentioned first embodiment, when atmospheric pressure is updated in the area above the threshold S/L and when the open angle of the throttle valve is under the threshold S/L, control passes from Step S2 to Step S7, in which the open angle of the throttle valve based on the updated atmospheric pressure is cleared to the closed angle of the throttle valve (open angle clearing means).

Figure 5:
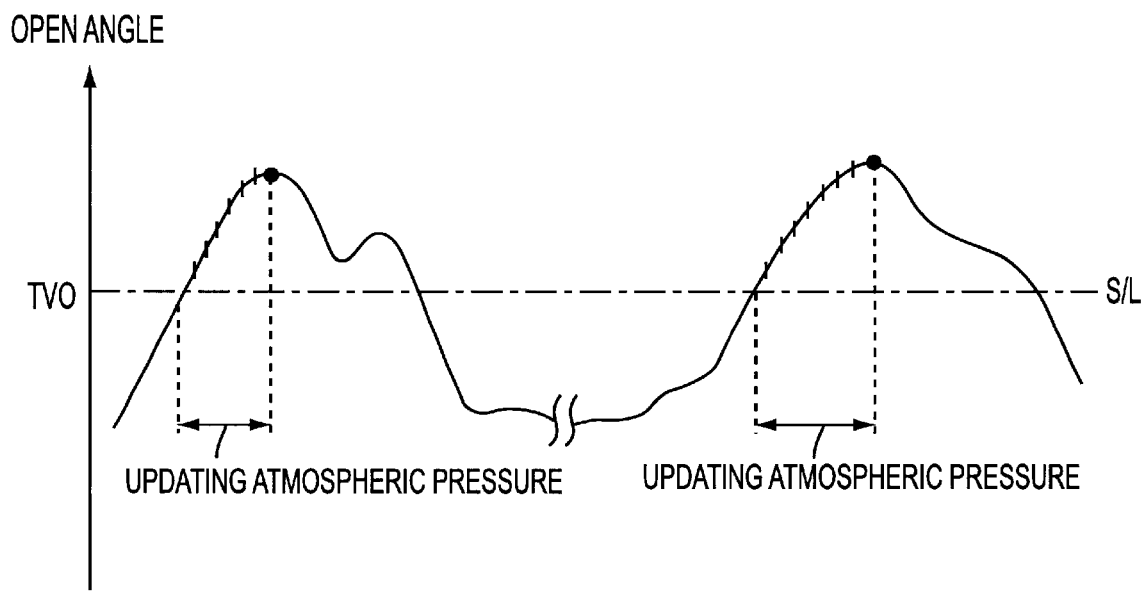
FIG. 5 is another time chart showing detecting characteristics of atmospheric pressure according to the first embodiment of the present invention.

Therefore, when the open angle of the throttle valve is above the threshold S/L again, atmospheric pressure is updated. Furthermore, when the open angle of the throttle valve is increasing and the present open angle of the throttle valve is greater than the last updated open angle of the throttle valve, atmospheric pressure is updated sequentially. As a result, each time when the open angle of the throttle valve crosses above the threshold S/L, atmospheric pressure is updated and the stored value of atmospheric pressure can respond quickly to the change of atmospheric pressure, as shown in FIG. 5.

Figure 6:
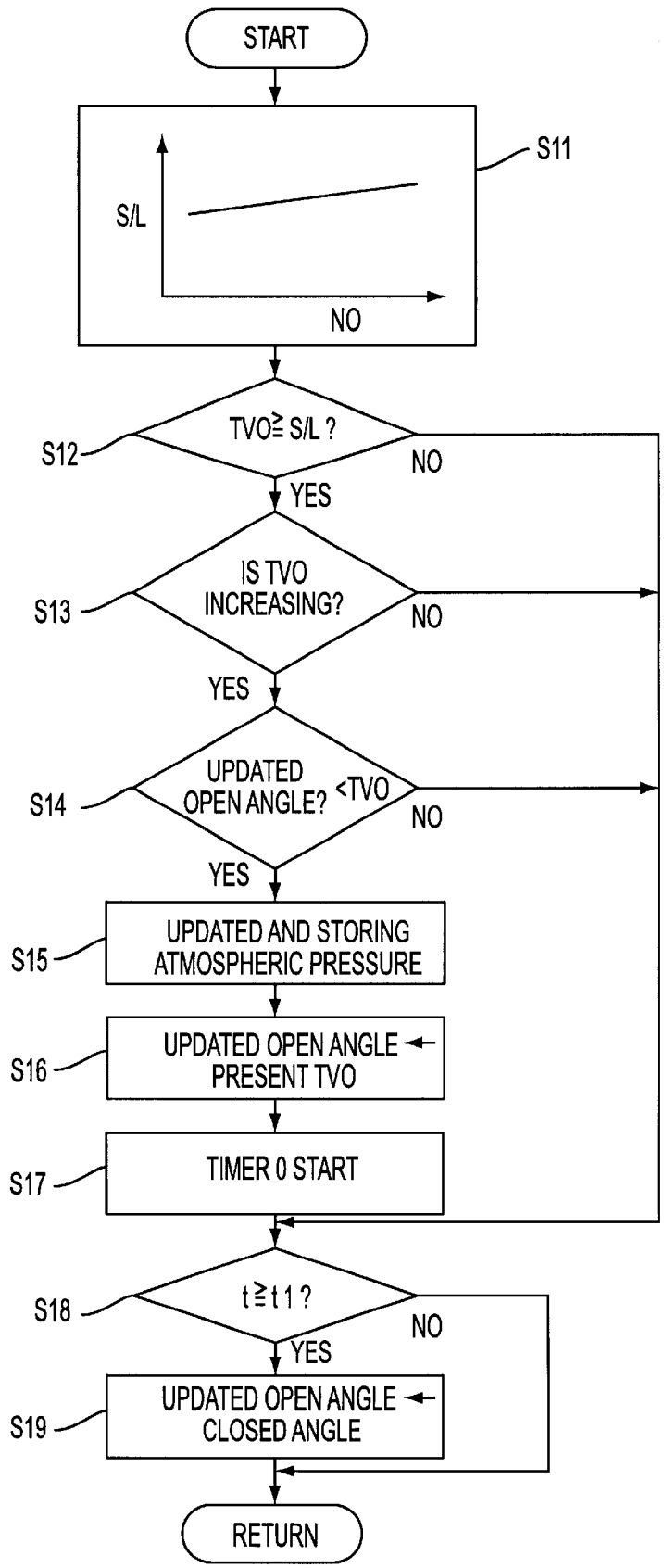
FIG. 6 is a flowchart of the atmospheric pressure detecting control process according to the second embodiment of the present invention.

The second embodiment includes an apparatus for detecting atmospheric pressure in an internal combustion engine in accordance with the logic shown in the flowchart of FIG. 6.

This method differs from the first embodiment as shown in the FIG. 2 Flowchart in that the method of clearing the open angle of the throttle valve is based on an updated atmospheric pressure.

That is, processing from Step S11 to Step S16 corresponds to the Steps S1 to S6 of FIG. 2. When the open angle of the throttle valve is below the threshold S/L in S11, the open angle of the throttle valve is not reset to the closed angle of the throttle valve. When atmospheric pressure is updated in S16, a timer for determining an elapsed-time t is started in Step S17. In Step S18, it is decided whether the elapsed-time t from the newest updated atmospheric pressure determined by the timer is above a predetermined-time t1.

Figure 7:
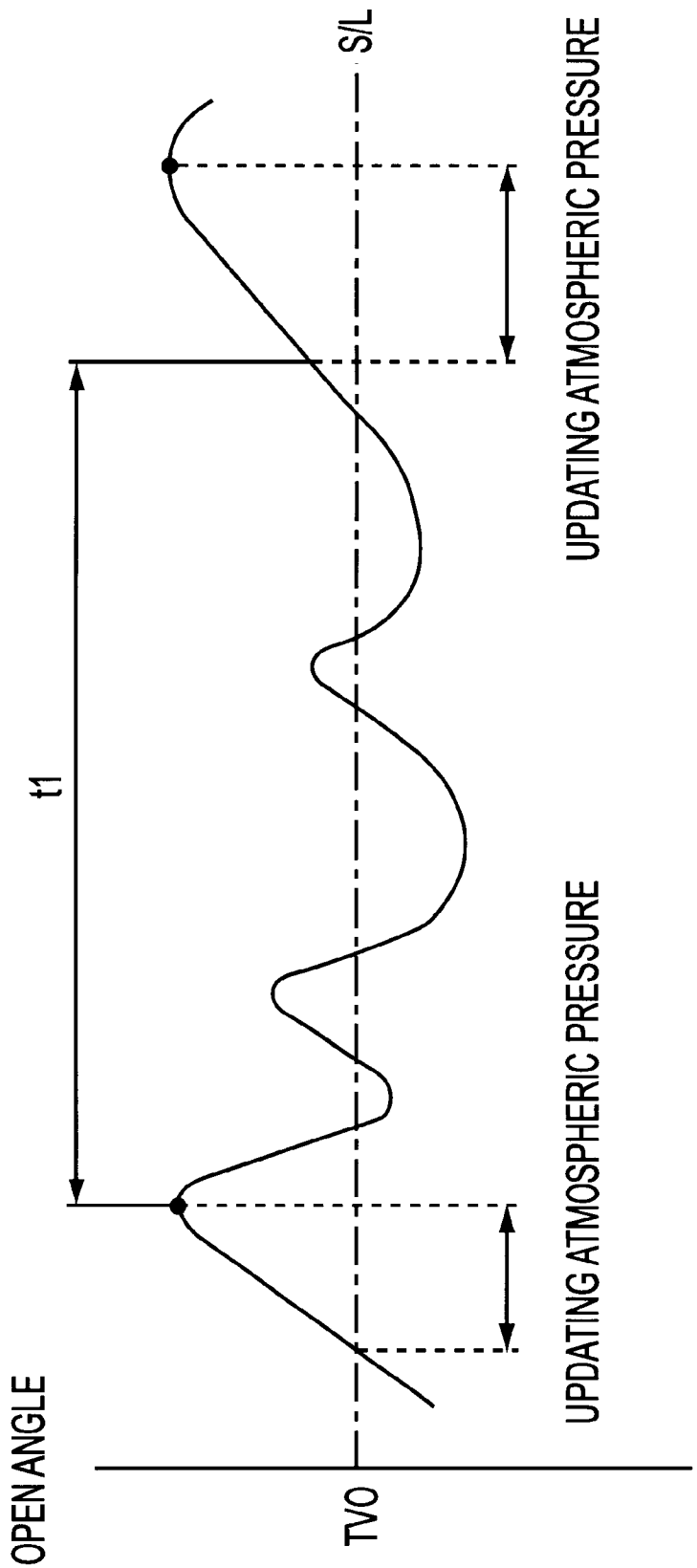
FIG. 7 is a time chart showing detecting characteristics of atmospheric pressure according to the second embodiment of the present invention.

When the elapsed-time t exceeds the predetermined time t1, the open angle of the throttle valve based on updated atmospheric pressure is reset to the closed angle of the throttle valve in Step S19 (open angle clearing means). Therefore, when the present open angle of the throttle valve is greater than the updated open angle of the throttle valve after atmospheric pressure is updated, atmospheric pressure is updated before the elapsed-time t exceeds the predetermined-time t1. On the other hand, when the open angle of the throttle valve is not greater than the updated open angle of the throttle valve before the elapsed-time t exceeds the predetermined-time t1, the updated atmospheric pressure is maintained even with the open angle of the throttle valve falls short of the threshold S/L. Therefore, for the predetermined time t1, the atmospheric pressure is maintained based on the maximum open angle of the throttle valve as shown FIG. 7.

For example, even though the open angle of the throttle valve is increasing and crossing the threshold after detecting atmospheric pressure in the vicinity of the full-open angle of the throttle valve, atmospheric pressure is not updated if the present open angle of the throttle valve is smaller than the last updated open angle of the throttle valve. As a result, it prevents the unnecessary update on the smaller open angle of the throttle valve.

Furthermore, in the flowchart of FIG. 6, the last updated open angle of the throttle valve can be maintained until after the predetermined time t1 is reached. Also, the measured atmospheric pressure corresponding to the last updated open angle of the throttle valve can be maintained until the predetermined time t1 is reached. It also means that predetermined time t1 is reset when the atmospheric pressure changes above the threshold value (S/L).

The entire contents of Japanese Patent Application No. TOKUGANHEI 10-120678, filed Apr. 30, 1998, is incorporated herein by reference. The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. These embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An apparatus for detecting atmospheric pressure in an internal combustion engine, comprising:

an open angle detecting portion for detecting an open angle of a throttle valve; and an atmospheric pressure detecting portion for updating detected atmospheric pressure based on an aspiration pressure when said open angle of said throttle valve is above a threshold value (S/L) and is increasing, wherein the atmospheric pressure detecting portion does not update the detected atmospheric pressure if the open angle of said throttle valve is above the threshold value (S/L) and is not increasing.

2. The apparatus for detecting atmospheric pressure in an internal combustion engine as defined in claim 1, wherein said atmospheric pressure detecting portion updates the detected atmospheric pressure based on the aspiration pressure when said open angle of said throttle valve is above said threshold value (S/L), is increasing, and when a present open angle of said throttle valve is greater than a last updated open angle of said throttle valve.

3. The apparatus for detecting atmospheric pressure in an internal combustion engine as defined in claim 1, further comprising:

an open angle clearing portion for clearing said open angle of said throttle valve when a present open angle of said throttle valve is under said threshold value (S/L).

4. The apparatus for detecting atmospheric pressure in an internal combustion engine as defined in claim 1, further comprising:

an open angle clearing portion for clearing a last updated open angle of said throttle valve after a predetermined time.

5. The apparatus for detecting atmospheric pressure in an internal combustion engine as defined in claim 4, further comprising:

a timer for determining whether an elapsed time exceeds said pre-determined time.

6. The apparatus for detecting atmospheric pressure in an internal combustion engine as defined in claim 1, further comprising an aspiration pressure sensor for detecting the aspiration pressure.

7. The apparatus for detecting atmospheric pressure in an internal combustion engine as defined in claim 1, wherein said threshold value (S/L) is decided based on an engine rotation speed.

8. The apparatus for detecting atmospheric pressure in an internal combustion engine as defined in claim 1, wherein the increasing of said open angle of said throttle valve is decided based on whether the present open angle of said throttle valve is greater than the last updated open angle of said throttle valve.

9. The apparatus for detecting atmospheric pressure in an internal combustion engine as defined in claim 8, wherein a newest detected value of said aspiration pressure sensor is assumed to be the detected atmospheric pressure.

10. An apparatus for detecting atmospheric pressure in an internal combustion engine, comprising:

open angle detecting means for detecting an open angle of a throttle valve; and atmospheric pressure detecting means for updating the detected atmospheric pressure based on an aspiration pressure when said open angle of said throttle valve is above a threshold value (S/L) and is increasing, wherein the atmospheric pressure detecting means does not update the detected atmospheric pressure if the open angle of said throttle valve is above the threshold value (S/L) and is not increasing.

11. The apparatus for detecting atmospheric pressure in an internal combustion engine as defined in claim 10, wherein said atmospheric pressure detecting means updates the detected atmospheric pressure based on the aspiration pressure when said open angle of said throttle valve is above said threshold value (S/L), is increasing, and when a present open angle of said throttle valve is greater than a last updated open angle of said throttle valve.

12. The apparatus for detecting atmospheric pressure in an internal combustion engine as defined in claim 10, further comprising:

open angle clearing means for clearing said open angle of said throttle valve when the present open angle of said throttle valve is under said threshold value (S/L).

13. The apparatus for detecting atmospheric pressure in an internal combustion engine as defined in claim 10, further comprising:

open angle clearing means for clearing the last updated open angle of said throttle valve after a predetermined time.

14. The apparatus for detecting atmospheric pressure in an internal combustion engine as defined in claim 13, further comprising:

timer means for determining whether an elapsed-time exceeds said predetermined time.

15. A method for detecting atmospheric pressure in air internal combustion engine, comprising the steps of:

detecting an open angle of a throttle valve of the internal combustion engine; and updating the detected atmospheric pressure based on air aspiration pressure when the open angle of the throttle valve is above a threshold value and is increasing, wherein the updating step does not update the detected atmospheric pressure if the open angle of said throttle valve is above the threshold value (S/L) and is not increasing.

16. The method according to claim 15, wherein the step of updating the atmospheric pressure includes updating the atmospheric pressure based on the aspiration pressure when the open angle of the throttle valve is above the threshold value, is increasing, and when a present open angle of the throttle valve is greater than a last updated open angle of said throttle valve.

17. The method according to claim 15, further comprising the step of:

clearing a last updated open angle of the throttle valve when a present open angle of the throttle valve is under the threshold value.

18. The method according to claim 15, further comprising the step of:

clearing a last updated open angle of the throttle valve after a predetermined time.

19. The method according to claim 18, wherein the predetermined time is compared to a measured elapsed time to determine whether to clear the last updated open angle.

* * * * *